United States Patent
Naumov et al.

(10) Patent No.: US 7,810,393 B2
(45) Date of Patent: Oct. 12, 2010

(54) METHOD FOR DETERMINING LINEAR ACCELERATION AND DEVICE FOR ITS IMPLEMENTATION

(75) Inventors: Michael Naumov, 3 Hazor Street, Tel Aviv (IL) 69016; George Naumov, Tel Aviv (IL)

(73) Assignee: Michael Naumov, Givatayim (IL)

( * ) Notice: Subject to any disclaimer, the term of this patent is extended or adjusted under 35 U.S.C. 154(b) by 368 days.

(21) Appl. No.: 12/006,728

(22) Filed: Jan. 7, 2008

(65) Prior Publication Data

US 2009/0145223 A1    Jun. 11, 2009

(30) Foreign Application Priority Data

Dec. 6, 2007    (IL) .................................... 187933

(51) Int. Cl.
*G01P 15/00*    (2006.01)

(52) U.S. Cl. ................................. 73/514.09; 73/514.11

(58) Field of Classification Search ............... 73/514.09, 73/514.11, 514.13, 514.32
See application file for complete search history.

(56) References Cited

U.S. PATENT DOCUMENTS

| | | | |
|---|---|---|---|
| 3,709,042 A * | 1/1973 | Lee et al. .................. | 73/514.13 |
| 5,668,319 A * | 9/1997 | Garabedian .............. | 73/514.09 |
| 6,851,317 B2 * | 2/2005 | Naumov et al. .......... | 73/514.09 |
| 7,543,494 B2 * | 6/2009 | Naumov et al. ........... | 73/178 R |

* cited by examiner

*Primary Examiner*—Helen C. Kwok

(57) ABSTRACT

The present technical solution for determining linear acceleration, the vector whereof is considered to be at a tangent to a trajectory of movement of a moving object, is based on determining new differences of accelerations. It is considered to be the basis for efficient, accurate, with the threshold of sensitivity equal to zero in small-size option solving the tasks of autonomous navigation, piloting, stabilization and etc. Said solution is irrespective of disturbance factors, in particular, cross-axis and centrifugal accelerations, vibrations, temperature and others, and can be used without any gyroscopes.

6 Claims, 2 Drawing Sheets

METHOD FOR DETERMINING LINEAR ACCELERATION AND DEVICE FOR ITS IMPLEMENTATION

FIELD OF THE INVENTION

Figure 1:
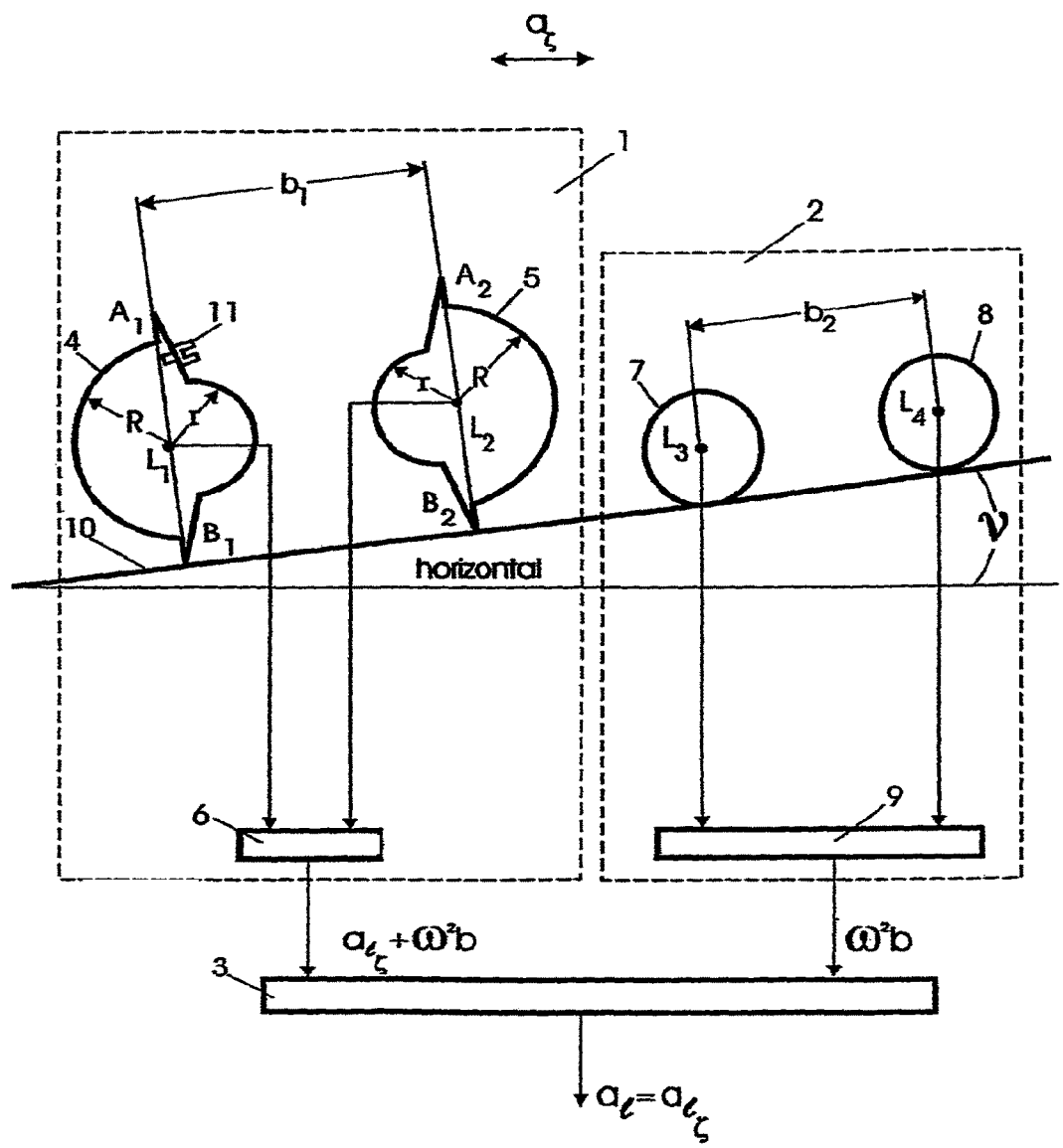

The present technical solution relates to measuring technique and can be used in the systems of stabilization of movement of transport means—vehicles (ground, air and sea); for navigation, piloting, ship navigation and other purposes.

BACKGROUND OF THE INVENTION

For determining acceleration use is made of accelerometers. The accelerometers are considered to measure so-called apparent acceleration. Owing to the above, while tilting their axes of sensitivity from the axis along which the measurement of acceleration is made (in particular, a horizontal or vertical axis) there occur major errors being impermissible. Said errors are caused by the action of cross-axis accelerations (in particular, vertical acceleration when measuring horizontal acceleration or horizontal acceleration when measuring vertical acceleration).

For decreasing said errors, said accelerometers are located on a complicated, expensive, heavy and bulky stabilized (in a horizontal plane) gyro platform. In addition to that, said gyro platform possesses other considerable drawbacks and shortcomings as well: a long initial alignment (for an accurate alignment tens of minutes are required), the necessity of using very precise gyroscopes, considerable dependence on the action of vertical acceleration, vibrations and others. However, it is impossible to implement absolutely precise leveling of said platform. Practically always there is its tilting relative to a horizontal plane. And although said tilting is minor, its harmful influence is considered to be rather noticeable, since the output signal from the accelerometers is usually integrated.

Let's show the above by way of examples.

Let some flying vehicle be moving at constant speed at constant altitude and let the platform be tilted only by a constant angle (not only by value but also by sign), it being equal to 1'.

In this case, due to integration of the apparent acceleration when determining horizontal distance or the altitude of a flight, as well as the depth of sinking in water, there occurs an accumulation error being approximately equal to 300 m per every minute of work, which is unacceptable.

For eliminating said error the authors have developed devices [1], [2], and [3]. Moreover, for the operation of said devices no gyro platform is required. They can be located directly on the body of a moving object, which makes the constructions much simpler, lighter, less expensive, and smaller in size.

However, both in said accelerometer and in said devices [1], [2], [3] there occurs an error caused by the action of centrifugal (centripetal) accelerations. When the moving object is being rotating, by itself or around any instantaneous center of the rotation, above error can be intolerably big.

For eliminating said error the use of azimuth stabilization is required, which makes the construction considerably more complicated, and thus, increases its weight, cost and sizes.

Moreover, the azimuth stabilization does not fulfill its function even in a straight and level flight, it being because of centrifugal (centripetal) accelerations occurring due to the Earth's rotation and the rotation of a flying vehicle around the Earth's center, when moving in the Earth's sphere. This harmful influence is especially noticeable when determining the altitude of a flight.

Let's show the above by way of example.

Let said flying vehicle be moving along the Earth's equator in an east direction at constant altitude at constant speed being approximately equal to 2000 km/hr. In this case, even with the strict location of the axis of sensitivity of measuring vertical acceleration (along a vertical), because of integration, there occurs an accumulation error in determining the altitude of the flight being equal to approximately 10 m per every minute of the flight, which is unacceptable as well.

Due to the causes mentioned above determining vertical acceleration is not unreasonable considered to be unstable and is not practically used.

These are objects of the present technical solution to considerably increase the accuracy, accelerate the readiness for operation, and decrease weight, price and sizes.

SUMMARY OF THE INVENTION

To meet the above objects of the present invention there is provided a method and a device for determining axial linear acceleration. Said acceleration presents the projection of the vector of linear acceleration on a chosen axis. Said vector is known to be at a tangent to a trajectory of movement of a moving object. As said axis to be chosen choice can be made of any straight line, particularly, a vertical or horizontal line (i.e. a straight line located in a vertical plane or horizontal plane), or any axis of the mobile object.

Knowing said projection on each of two chosen mutually perpendicular axes located in a horizontal plane enables one to determine a linear acceleration vector being at a tangent to the horizontal trajectory of movement of the moving object. This matters for determining the location of the mobile object on the Earth's surface.

Knowing said projection on each of three chosen mutually perpendicular axes (in particular, a vertical along a η-axis and two mutually perpendicular horizontal axes: longitudinal ξ and transverse ζ) enables one to determine a linear acceleration vector at a tangent to a spatial trajectory of movement of the moving object. This matters for determining the location of the moving object in the space.

An acceleration vector a of the moving object in general case consists of three vectors: a linear acceleration vector, centrifugal (centripetal) acceleration vector and vector of Coriolis acceleration.

Therefore, the projection of the vector a on an axis chosen in general case is equal to $$a_a = a_l + a_c + a_k \tag{1}$$

where $a_a$—projection of said vector a on the axis chosen.

Let us call $a_a$ axial acceleration.

$a_l$—projection of the linear acceleration vector tangent to the trajectory of movement of the moving object on the same axis chosen.

Let us call $a_l$ axial linear acceleration.

$a_c$—projection of the vector of centrifugal (centripetal) acceleration on the same axis chosen.

Let us call $a_c$ axial centrifugal (centripetal) acceleration;

$a_k$—projection of the vector of Coriolis acceleration on the same axis chosen.

Let us call $a_k$ axial Coriolis acceleration.

Coriolis acceleration is considerably small (even for aircrafts it is not expected to be more than one hundredth parts of the value 1 m/sec$^2$). Therefore, (and because of the fact that it is not considered to be dangerous) in the present application said Coriolis acceleration is neglected. However, in a special case Coriolis acceleration can be taken into account by means of technical implementation of a known mathematical formula for this acceleration. Moreover, since Coriolis acceleration is small enough, then for the compensation of said acceleration it is enough to know even approximate values being the components of said mathematical formula (the linear velocity of relative motion and angular velocity of transient motion, in particular, the angular velocity of the Earth being practically constant value).

It is known that considerable amount of accidents and crashes of ground vehicles, in particular, cars, takes place in the places of turning (turning around). They are because of the action of horizontal linear transverse acceleration $a_{l_\zeta}$ in a transverse direction (to be more exact, the action of the force causing said acceleration) along a horizontal axis $\zeta$. Thus, the determination of this dangerous acceleration is of special interest. Due to the above (as well as due to rather small, for ground vehicles, the value of Coriolis acceleration) further by way of concrete example consideration will be made of the determination of the acceleration $a_{l_\zeta}$, the latter acting along a horizontal transverse axis $\zeta$.

However, it should be taken into account, that the provided technical solution is true for air and water transport and for any other axis chosen (in particular, not only vertical but horizontal as well).

In general case, radii of rotation (turning) are not known. So, for eliminating the necessity of knowledge of said radii the present solution has brought, for the first time, the differences of centrifugal (centripetal) accelerations of two points located along the axis chosen of the moving object (in particular, longitudinal or transverse axis of the moving object). Herewith, the distances between these two points are known. Let us mark said difference of centrifugal (centripetal) accelerations through $\Delta a_v$.

Let us call this difference of centrifugal accelerations axial differential centrifugal acceleration. This acceleration is determined in a horizontal plane.

In connection with the above, the provided method for determining axial linear acceleration comprises the following stages:

determining axial acceleration, in particular, horizontal transverse acceleration $a_\zeta$, including in itself axial linear acceleration $a_l$ (i.e., the projection of linear acceleration vector on an axis chosen), in particular, $a_{l_\zeta}$, axial linear acceleration along an axis $\zeta$, and axial differential centrifugal acceleration $\Delta a_v$;

determining said axial differential centrifugal acceleration $\Delta a_v$;

determining said axial linear acceleration $a_l$, particularly, $a_{l_\zeta}$, by the difference of said axial horizontal acceleration $a_\zeta$ and said axial differential centrifugal acceleration $\Delta a_v$.

Device for implementation of the provided method is fastened on said moving object, which comprises mutually connected:

an axial acceleration sensor, an axial differential centrifugal acceleration sensor, a differential scheme from the output whereof a signal of axial linear acceleration being taken, said sensors being connected thereto.

A horizontal axes and a vertical may be chosen as axes for measuring above mentioned accelerations.

As the axes chosen use also can be made of, in particular, the axes of the moving object, for example, its longitudinal, transverse and vertical axis, in particular, if the body of said object is used as a horizontal platform [4].

The axial differential centripetal acceleration sensor may comprise a pair of known identical centrifugal acceleration sensors (for example, with centrifugal weights), they being connected to the differential scheme, from the output whereof the signal of axial differential centrifugal acceleration is taken.

However, each of said measuring sensors is known to have considerable drawbacks and shortcomings: presence of the threshold of sensitivity and considerable dependence on a tilt angle. Therefore, in the present application there is provided an axial differential centrifugal acceleration sensor, wherein the above considerable drawbacks and shortcomings are eliminated.

Each of said sensors included in the device provided has two sealed miniature vessels filled with flowing medium, in particular, liquid, and provided with pressure sensors. The distance between the point of determining pressure along the chosen axis of the moving object is known.

Let us mark this distance in the axial acceleration sensor, in particular, in a horizontal acceleration sensor, through $b_1$, and in the axial differential centrifugal acceleration sensor—through $b_2$, correspondingly.

The authors have found such a ratio between $b_1$ and $b_2$, wherewith any harmful influence of centrifugal (centripetal) accelerations is eliminated.

As a result the same signal of said axial differential centrifugal acceleration $\Delta a_v = \omega^2 b$ is being taken from the output of each said sensor, where $\omega$—angular velocity of rotation, and the value of b varies when tilting. This ratio, in case of necessity, may be corrected by means of practice.

Therefore, the axial acceleration sensor determines, thanks to the ratio chosen between $b_1$ and $b_2$, the value $a_l + \omega^2 b$, and the axial differential centrifugal acceleration sensor determines a value $\Delta a_v = \omega^2 b$.

Since the outputs of said sensors are connected to a differential scheme, then from the output thereof (i.e. from the output of the provided device) the signal of the axial linear acceleration $a_l$, in particular, $a_{l_\zeta}$ is taken:

$$(a_l + \Delta a_v) - \Delta a_v = a_l, \quad (2)$$

$$(a_{l_\zeta} + \omega^2 b) - \omega^2 b = a_{l_\zeta}. \quad (3)$$

For determining accelerations use is made of pressure sensors. As said pressure sensors use can be made of any known pressure sensors, predominantly, of semiconductor type, wherein under influence of pressure the changes of specific resistances take place.

The pressure sensors are switched connected to differential blocks. As differential scheme and differential block use can be made of a electrical bridge, magnetic amplifier by differential scheme, scheme of difference of electrical parameters (currents, voltages, as well as active, capacitance, and inductive resistances).

As an inertial body choice is made of flowing medium (liquid, gas or their mixture), in particular, silicone oil, ligroin and etc. This flowing medium fills miniature sealed vessels, tightly fastened on one and the same base (platform), in particular, on the body of a moving object. The vessels of each corresponding, joint pair have been chosen to be located predominantly in the places with identical vibrations and temperature.

The inner cavities and contours of their cross-sections of the pair of the miniature vessels used for determining said axial acceleration (in particular, along a horizontal axis $\zeta$, chosen marked through $a_\zeta$), are chosen to be predominantly the same.

The inner cavities and the contours of their cross-section of the pair of the miniature vessels used for determining the axial differential centrifugal acceleration $\Delta a_v$ are also chosen to be the same.

Own rotation of a moving object occurs around a pole, in particular, around the center of mass of the moving object. The location of said pole in the process of movement changes within known limits. For eliminating the influence of the location of the pole, the contours of the cross-sections of the inner cavities are located beyond said limits.

The contours are located in a plane passing through mutually perpendicular axes, one of which being the vertical axis of the moving object, and another one being the chosen axis of the moving object, in particular, its transverse axis.

By way of an example, the present application describes determination of the axial linear acceleration $a_{l_\zeta}$ acting along a horizontal transverse axis $\zeta$. In this example, the axial acceleration is considered to be horizontal acceleration $a_\zeta$, it being determined by the axial acceleration sensor (the sensor $a_\zeta$).

Said axial acceleration includes the axial linear acceleration $a_{l_\zeta}$ acting along an axis $\zeta$ and the axial differential centrifugal acceleration $\Delta a_v$ acting along the same axis as well.

In the sensor $a_\zeta$ each of said contours is asymmetrical (in particular, relative to the point of determining pressure) along the chosen horizontal axis $\zeta$.

For determining horizontal acceleration (i.e. said axial acceleration) of different polarity the asymmetrical contours of the inner cavities of the joint pair of the sealed vessels are counter-oriented (non-congruent).

Since said contours are identical and the points of determining pressure in the identical inner cavities are located identically, the cross-axis acceleration acting along a horizontal axis $\xi$ being perpendicular to a horizontal axis $\zeta$ creates equal pressures in these points. Due to the above, the difference of the signals of said pressures is equal to zero. Therefore, said cross-axis acceleration does not cause any harmful influence on determining acceleration $a_{l_\zeta}$.

For eliminating any harmful influence of cross-axis acceleration $a_\eta$ (vertical acceleration acting along a vertical, i.e. along an axis $\eta$) in each of said contours there are extreme points, they being the most distant from the points of determining pressure. These points are counter-oriented on a line perpendicular to the chosen axis of the moving object, in particular, its transverse axis. If said transverse axis of the moving object is considered to be the chosen axis, then said extreme points are upper and lower. These points, when permissible tilting, in particular, of the transverse axis (at about up to 45°) remains along the vertical at the same, but changeable, distances from the points of determining pressure. Permissible tilts are those when said most distant points ($A_1$ and $B_1$, $A_2$ and $B_2$) remain as such (the most distant), in particular, along a vertical.

Therefore, the cross-axis acceleration $a_\eta$ directed along the vertical) with these tilts causes equal pressures in said points, as a result of the latter, said acceleration does not cause any harmful influence on determining horizontal acceleration, in particular, the axial horizontal transverse acceleration $a_\zeta$, where $a_\zeta = a_{l_\zeta} + \omega^2 b$.

In the axial differential centrifugal acceleration sensor use is made of a pair of identical contours, in particular, circle, wherein the points of determining pressure are identically located, particularly, at the centre of the circle. Therefore, in this sensor the vertical acceleration $a_\eta$ does not cause any harmful influence on determining the axis differential centrifugal acceleration $\Delta a_v$.

Thus, the vertical acceleration $a_\eta$ does not causes any harmful influence on determining the axial linear acceleration $a_{l_\zeta}$.

Since the acceleration $a_{l_\zeta}$ does not causes any harmful influence on determining the acceleration $a_{l_\zeta}$, then the axis of sensitivity of the provided device is horizontal, herewith, irrespective of permissible tilting (tens of degrees).

With tilt angles over 45° (v>45°) it is not the acceleration $a_{l_\zeta}$ that is determined but axial linear vertical acceleration $a_{l_\eta}$ being perpendicular thereto and directed along a vertical. Herewith, the axis of sensitivity of the provided device is vertical (directed along a vertical) and also irrespective of permissible tilting from the vertical (also tens of degrees).

Thus, the axis of sensitivity of the provided device can either be strictly horizontal or strictly directed along a vertical.

For the columns of the flowing medium of the same length to act on the points of determining pressure along a horizontal (the axis in a horizontal plane) with said tilting by the angles v, as the points of determining pressure in each said contour of the sensor $a_\zeta$ use is made of a common center of two spherical surfaces (inner cavity of the sealed vessel) of different radii (R and r). The contours of the cross-sections of said spherical surfaces present the arcs of circles of different radii (R and r) being counter-oriented.

The common centre (the point of determining pressure) of the arcs, as well as said extreme points are on the same straight line in each of the contours. The lines of the contours of the cross-sections of the inner cavities of both of the vessels are parallel.

Said contours of the inner cavities of the joint pair of the miniature sealed vessels designed for determining said axial acceleration, in particular, $a_\zeta$ are also counter-oriented. This counter-orientation is implemented by the location of spherical parts of the inner cavities of the sealed vessels of one and the same radius on either side from the centers of the spherical surfaces.

The signals of pressures in two said centers (i.e. in the points of determining pressure) are supplied to the differential block, from the output whereof a signal $a_l + \Delta a_v$ is taken, in particular, a signal $a_{l_\zeta} \omega^2 b$.

In the axial differential centrifugal acceleration sensor the contours of the inner cavities of the two miniature sealed vessels filled also with the flowing medium are congruent (identical and superposedly-oriented). Congruency means that with imaginable parallel transferring, these contours are superposed. In particular, the inner cavities are used in the form of spheres. The center of each of said sphere is the point of determining pressure.

The signals of pressures in these points are supplied to their own differential block, from the output whereof the signal $\Delta a_v = \omega^2 b$ of the axial differential centrifugal acceleration is taken.

It is natural, that the axis of sensitivity of the axial differential centrifugal acceleration sensor is also horizontal irrespective of tilting.

No other accelerations but centrifugal (centripetal) ones directed along an axis $\zeta$ does not cause any changes of the output signal of the axial differential centrifugal acceleration sensor.

The signals of said axial acceleration and said axial differential centrifugal acceleration are supplied to the differential scheme, from the output whereof the signal of axial linear acceleration $a_l$, in particular, the signal of linear transverse acceleration $a_{l_\zeta}$ acting along the axis $\zeta$ is taken.

Owing to the application of differential scheme and differential blocks any harmful influence, besides cross-axis accelerations, and other disturbance factors (vibrations, temperature and others) is eliminated.

Under the influence of pressure of filling the flowing medium into the sealed vessels and the pressure acted on each point of determining pressure by the vertical column of the flowing medium, it being located above said point, each pressure sensor is always in permanent readiness for operation (overcoming the zone of non-sensitivity is not required). That means that the threshold of sensitivity of every pressure sensor is equal to zero.

Each vessel can be provided with a screw with a thread in its wall and the body of said screw is partially located in the inner cavity. It sets conditions for the opportunity of calibration (adjustment), in particular, before putting into practice. With screwing, the pressure in the vessel is increasing and with unscrewing—decreasing, correspondingly.

The places of fastening said vessels on the body of the moving object or on some stabilized platform should be chosen, if possible, with equal vibrations and temperature. It should be taken into account that the provided device is influenced, unlike in the prior art, not by vibrations and temperature changes but by the difference of the vibrations and difference of the temperature changes in the places of fastening the vessels, which sets conditions for the opportunity of eliminating any harmful influence of said disturbance factors.

It is necessary to bear in mind that the provided device may be used for the first time to solve the task of stable precise determination of axial linear vertical acceleration.

Herewith, any harmful influence of not only horizontal but also of any centrifugal (centripetal) accelerations is eliminated, including those occurring due to the rotation of the Earth and the rotation of the moving object around the Earth's center.

BRIEF DESCRIPTION OF THE INVENTION

The present technical solution is illustrated by the accompanying drawings.

FIG. 1—a structural (functional) scheme for determining axial linear acceleration is shown, it acting along a horizontal axis, in particular, transverse axis $\zeta$. In this drawing there are not vessels and the wall thickness whereof shown, but there are cross-sections of inner cavities of vessels shown, and there are not pressure sensors shown, but the points ($L_1$ and $L_2$, $L_3$ and $L_4$) of determining pressure by means of said sensors are shown.

Figure 2:
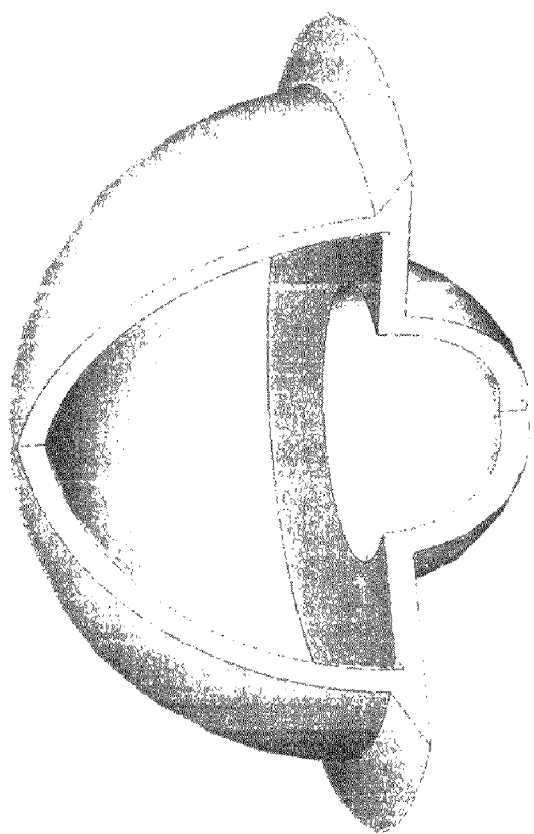

FIG. 2—shows an inner cavity of the vessel of the axial acceleration sensor.

Figure 3:
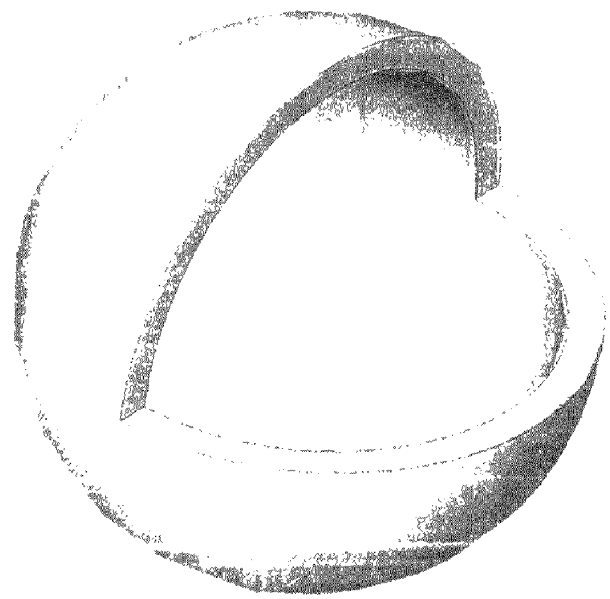

FIG. 3—shows the inner cavity of the vessel of the axial differential centrifugal acceleration sensor.

DETAILED DESCRIPTION OF THE INVENTION

Determination of linear acceleration (vector whereof being at a tangent to a trajectory of movement of a moving object) is based on determining of the projection of said vector on each of three chosen mutually perpendicular axes. Said projection is called axial linear acceleration.

The provided method for determining axial linear acceleration on a chosen axis comprises the following mutually connected stages:

determining axial acceleration consisting of axial linear acceleration and axial differential centrifugal acceleration, determining said axial differential centrifugal acceleration, determining said axial linear acceleration by the difference of said axial acceleration and said axial differential centrifugal acceleration.

By way of an example, in the present application consideration is given to the determination of axial linear acceleration along a horizontal axis denoted by the letter $\zeta$ (called a horizontal transverse axis).

The device implementing the provided method of determining axial linear acceleration comprises (FIG. 1): an axial acceleration sensor 1, in particular, a horizontal transverse acceleration sensor. Herewith, the horizontal transverse acceleration $a_\zeta$ includes axial linear transverse acceleration $a_{l_\zeta}$ and axial differential centrifugal acceleration $\Delta a_v$;

an axial differential centrifugal acceleration sensor 2 and a differential scheme 3, to which said sensors are connected. From the differential scheme 3 (from the output of the provided device) the signal of axial linear horizontal acceleration is being taken, in particular, of acceleration $a_l=a_{l_\zeta}$.

The sensor 1 comprises two miniature sealed vessels filled with flowing medium, in particular, liquid, and provided with pressure sensors determining pressures in points $L_1$ and $L_2$.

In FIG. 1 there are shown used (for determining said axial acceleration) contours 4 and 5 of cross-sections of inner cavities of the vessels.

The pressure signals in the points of determining pressure $L_1$ and $L_2$ are supplied to a differential block 6, from the output whereof a signal $a_\zeta$ is outputted. This signal is supplied to the differential scheme 3.

The sensor 2 also comprises two miniature sealed vessels filled with flowing medium, in particular, liquid, and provided with pressure sensors determining pressures in the points $L_3$ and $L_4$.

In FIG. 1 there are shown used (for determining said axial differential centrifugal acceleration) contours 7 and 8 of cross-sections of inner cavities of the vessels.

The signals of pressures in the points of determining pressure $L_3$ and $L_4$ are supplied to a differential block 9, from the output whereof a signal $\Delta a_v=\omega^2 b$ is outputted, where $\omega$-angular velocity, and b—varies when tilting. This signal is also supplied to the differential scheme 3.

By the letter $b_1$ we shall denoted the distance between the points $L_1$ and $L_2$, and by the letter $b_2$—between the points $L_3$ and $L_4$, correspondingly. Herewith, the ratio between $b_1$ and $b_2$ is chosen so that the difference $\Delta a_v$ to be contained in the signal of the sensor 1, being supplied to the differential scheme 3, and the signal of the sensor 2 be equal by value to $\omega^2 b$. This equation, when required, is implemented by means of practice.

The inner cavity of each vessel of the sensor 1 consists of two semispheres (FIG. 2) with different radii R and r and a common center (the points $L_1$ and $L_2$, correspondingly). So, the contour of the cross-section of the inner cavity of said vessel comprises the arcs of circles of said radii. These arcs are counter-oriented (located on either side from the common center). At the same time, the contours of the cross-sections of both vessels are also counter-oriented (the arcs of one and the same radius are not congruent), which enables one to determine horizontal acceleration, in particular, the acceleration $a_\zeta$, where $a_\zeta=a_{l_\zeta}+\omega^2 b$.

In each contour 4 and 5 there are extreme (the most distant along, a vertical from the points of determining pressure) points being counter-oriented on a vertical axis of the moving object: an upper ($A_1$ and $A_2$) and lower point ($B_1$ and $B_2$). Said points ($A_1$ and $A_2$, $B_1$ and $B_2$) are located on the circles (FIG. 2) of a radius $R_0 = A_1L_1 = B_1L_1 = A_2L_2 = B_2L_2$. Owing to these extreme points any harmful influence of the cross-axis (vertical) acceleration $a_\eta$ is eliminated. It is explained by the fact that the points $L_1$ and $L_2$ are acted upon on a vertical by the columns of the flowing medium of equal heights, they being equal to $R_0 \cos \nu$ (taking into account that $A_1L_1B_1$ is parallel to $A_2L_2B_2$), where $\nu$—angle of non-horizontality (a tilt angle relative to a horizontal plane) of a platform 10 (particularly, of the body of the moving object), whereon there are all the miniature 4 vessels of the device tightly fastened, it implementing the provided method.

A cross-axis horizontal acceleration, in particular, $a_\xi$ (perpendicular to the acceleration $a_\zeta$) also does not make any harmful influence on determining the acceleration $a_\zeta$ to be measured, since the inner cavities of both vessels of the sensor 1 are identical, as a consequence thereof, the points $L_1$ and $L_2$ are acted upon in a horizontal plane by the columns of the flowing medium of equal lengths herewith.

At the same time, the horizontal acceleration $a_\zeta$ (said axial acceleration) causes in the point $L_1$ a pressure $P_1 = \rho a_\zeta R$ (where R—radius of a bigger semisphere) and in the point $L_2$ a pressure $P_1 = \rho a_\zeta r$ (where r—radius of a smaller semisphere). So, from the differential block 6 there is a signal $\Delta P$ (irrespective of tilting) supplied to the differential scheme 3 equal to $$\Delta P = P_1 - P_2 = \rho a_\zeta (R - r), \quad (4)$$

where $$a_\zeta = \frac{\Delta P}{\rho (R - r)}. \quad (5)$$

The points $L_1$ and $L_2$ are acted upon by the influence of the axial linear transverse acceleration $a_{l_\zeta}$ and the axial differential centrifugal acceleration $\Delta a_\nu$.

So, $$a_\zeta = a_{l_\zeta} + \Delta a_\nu = a_{l_\zeta} + \omega^2 b \quad (6)$$

The sensor 2 comprises also two miniature sealed vessels filled with flowing medium, in particular, liquid, and provided with pressure sensors determining the pressures in the points $L_3$ and $L_4$.

Unlike the sensor 1, the contours of the cross-sections of the inner cavities of the vessels in the sensor 2 are superposedly oriented and, since they are identical, they are considered to be congruent. In particular, use is made of the inner cavities of the vessels in the sensor 2 in the form of spherical surfaces (hollow spheres with equal radii FIG. 3). So, the contours of the cross-sections of said cavities present circles with equal radii.

The points of determining pressure $L_3$ and $L_4$ present the centers of these contours (the circles) 7 and 8.

Since the signal $\Delta a_\nu = \omega^2 b$ is outputted from the differential block 9, from the output of the differential scheme 3 the signal of difference is taken $$a_{l_\zeta} = (a_{l_\zeta} + \omega^2 b) - \omega^2 b \quad (3)$$

From (3) it is seen that in the provided technical solution determination is made of the axial linear acceleration, irrespective of tilting and acting of cross-axis and centrifugal (centripetal) accelerations.

The contours 4 and 5, 7 and 8 are located in a plane passing through two mutually perpendicular axes, one of which being a vertical axis of the moving object, and another one—a transverse axis of the object.

In conformity with Pascal's law there are lots of places possible for fixing a pressure sensor, since, in particularly, with rotating this sensor in a horizontal plane round the point of determining pressure, its output signal is not changing.

In each vessel used for the initial calibration there is provided a screw 11 shown by way of an example on the contour 4. The body of the screw is partially located in the inner cavity of the vessel. When screwing said screw, the pressure is increasing, when unscrewing, it is decreasing, accordingly.

As the differential scheme and each differential block, use can be made of a Wheatstone bridge, magnetic amplifier by differential scheme, electrical scheme of difference of electrical parameters (currents, voltages, as well as active, capacitance and inductive resistances).

As each pressure sensor, use can be made of any known pressure sensor, preferably with a semiconductor sensitive element, which is known to have changes of specific resistance when the pressure changes.

In the provided device the pressure sensors operate with the sensitivity threshold being practically equal to zero. It is explained by the fact that they are acted upon by the pressure of filling the flowing medium, in particular, liquid, into the vessels and the pressures which are caused by the columns of the medium located above them.

The places of fastening the vessels on the body of the moving object or on some stabilized platform should be chosen, if possible, with equal vibrations and temperature. It should be taken into account that the provided device is influenced, unlike in the prior art, not by vibrations and temperature changes but by the difference of the vibrations and difference of the temperature changes in the places of fastening the vessels, which sets conditions for the opportunity of eliminating any harmful influence of said disturbance factors.

The operation of the provided device consists in determining the signals of pressures in the points $L_1$ and $L_2$, $L_3$ and $L_4$ and determining the differences of these pressures.

The provided application presents a group of inventions (a method and device) united by one inventive idea—determining linear acceleration.

The present solution is the basis for an efficient solution of other important tasks, which are expected to be the basis of further patenting.

Knowing axial linear accelerations acting along mutually perpendicular horizontal axes $\xi$ (longitudinal) and $\zeta$ (transverse) is expected, through the most optimum way, to enable one to carry out movement stabilization and piloting of flying vehicles, their navigation [4], to determine their true meridian [5], ground speed, angle of drift of a moving object, wind speed vector and others.

Using the provided solution in the device [5] any harmful influence is eliminated of not only centrifugal (centripetal) accelerations caused by own rotations of the moving object but also by its turning around instantaneous centers of rotations.

Special attention should be paid to the movement stabilization of ground vehicles, in particular, automobiles.

For the stabilization, use is made of an accelerometer, which is considered to give out just the signal of axial transverse linear acceleration $a_{l_\zeta}$. But the accelerometer does not fulfill said task (it determines so-called apparent acceleration) in accordance with two reasons: because of tilting and presence of centrifugal (centripetal) accelerations.

The roadway, even an asphalted one, is known to have tilting by some degrees. And a high-sensitivity accelerometer is known to react to the fractions of second of arc. So, even with unavoidable negligibly small transverse movements, said accelerometer gives out false signals.

Even with performing coordinated (proper) turns (i.e. whereby the axial transverse linear acceleration is equal to zero) said accelerometer reacts to centrifugal (centripetal) accelerations occurring herewith. In this case it gives out false signals being very dangerous.

Therefore, the designers are forced to bring sensors for measuring many other parameters up to gyroscopic devices into the system of movement stabilization and bring the system of comparing initial data (in particular, the places of turning and their radii) together with the actual data.

The above makes the system to be considerably more complicated, more expensive, much heavier and bulkier.

Despite this fact, the system is not efficient enough, and starts operating only after the object moves in a transverse direction (herewith, precious time is wasted). Moreover, the system does not enable one to perform safe turning at any speed (it provides just speed limit).

The provided device enables one to carry out movement stabilization at any speed of movement by one parameter since it is the presence of axial transverse linear acceleration that is the cause of movement destabilization. The signal of said acceleration appears already at the moment of the vehicle tending to move, which sets the condition for reliable quickness (signal into the brake system is supplied before possible movement) of its coming into action. Moreover, herewith, it is not required that the value of said acceleration be measured, but just the detection of its presence. Therefore, herewith, the provided device can be used with lower accuracy.

Thus, the provided solution will enable to implement the movement stabilization of ground vehicles in the most efficient, simplest, less expensive, lightest and small-sized way.

Considerable Distinctions of the Solution Provided determining axial acceleration, including axial linear acceleration and axial differential centrifugal acceleration;
determining the axial differential centrifugal acceleration;
determining difference of said axial acceleration and said axial differential centrifugal acceleration.

Considerable Merits and Advantages of the Solution Provided for the first time a solution of precise determination of linear acceleration (the vector whereof being at a tangent to a trajectory of a moving object) is suggested;
for the first time the problem has been solved of the stable precise determination of vertical acceleration, (in airless space, including);
it is not required to perform horizontal and azimuth stabilization (the provided device can be fastened directly on the body of the moving object);
determination of axial linear acceleration presents the basis for efficient and accurate determination of the parameters of movement of the moving object;
it is not required that gyroscopes be used (the main sources of errors of inertial navigation systems);
quick readiness for operation and fast response;
the opportunity of an efficient and rather simple solution of movement stabilization of ground vehicles, particularly, automobiles, at any movement speed and at any form of their trajectory;
since the threshold of sensitivity of the provided device is practically equal to zero, there is no principal obstacles for achieving super high accuracy;
irrespective of permissible tilting (tens of degrees) the axis of sensitivity of the provided device can be either strictly horizontal, or strictly directed along a vertical;
since it is not required to have any stabilized gyro platform, the provided device turns out to be considerably simpler, lighter, less expensive and of smaller size compared to the prior art designed for the precise determination of acceleration.

We claim:

1. A method for determining linear acceleration comprising, along each axis chosen, in particular horizontal axis, the following stages:
   determining axial acceleration representing the sum of axial linear acceleration and axial differential centrifugal acceleration,
   determining axial differential centrifugal acceleration,
   determining axial linear acceleration by the difference of said axial acceleration and said axial differential centrifugal acceleration.

2. A device for determining linear acceleration comprising along an axis chosen of a moving object, fastened on this object and mutually connected:
   an axial acceleration sensor,
   an axial differential centrifugal acceleration sensor,
   a differential scheme from an output of which a signal of axial linear acceleration being taken, and to which said axial acceleration sensor and said axial differential centrifugal acceleration sensor being connected.

3. The device according to claim 2, wherein the axial acceleration sensor comprising at least two vessels filled with flowing medium and provided with pressure sensors, a contour of cross-section of the inner cavity of each vessel of said axial acceleration sensor comprising counter-oriented arcs of circles of different radii with a common center, the common center of the arcs serving as a point for pressure determination.

4. The device according to claim 3 wherein counter-positioned, most remote from the common center, points being located on a line passing through the common center and perpendicular to said axis chosen, and the contour of cross-section of the inner cavity of each vessel is positioned along the axis chosen of the mobile object.

5. The device according to claim 4, wherein said contours of cross-sections of the inner cavities of the vessels of the axial acceleration sensor being counter-oriented along the axis chosen of the mobile object.

6. The device according to claim 2, wherein the axial differential centrifugal acceleration sensor comprising at least two vessels filled with flowing medium and provided with pressure sensors, the contours of cross-sections of the inner cavities of the vessels being positioned along the axis chosen and representing circles of equal radii, centers of the circles serving as points for pressure determination.

* * * * *